UNITED STATES PATENT OFFICE.

JOHN H. ASKIN, OF OSHTEMO, MICHIGAN.

PROCESS OF TREATING FRUIT-TREES.

SPECIFICATION forming part of Letters Patent No. 256,947, dated April 25, 1882.

Application filed November 21, 1881. (No specimens.)

*To all whom it may concern:*

Be it known that I, JOHN H. ASKIN, a citizen of the United States, residing at Oshtemo, (P. O. address Kalamazoo,) county of Kalamazoo, State of Michigan, have invented a new and useful Process of Treating Fruit-Trees, of which the following is a specification.

The object of my invention is to prevent blight to fruit caused by disease of the tree or sting of insects by stimulating the tree to a vigorous growth, preventing and curing disease, and destroying vermin.

One cause of disease in an abnormal growth of fruit-trees is the action of the sun on the bark, especially on those parts most directly exposed to said action. Another cause is allowing diseased branches to remain long on the tree, and a further cause is the well-known action of insects, grubs, and other vermin upon the roots, tree proper, and the fruit.

In treating the trees my process consists in first cutting away the dead and diseased branches, then varnishing the trunk and remaining branches with a soap compound of a soft consistency when applied. This coating protects the bark from the action of the sun and insects. I then dig holes in the ground, preferably on the north and south sides of the tree, and bury therein pieces of cast-iron, upon which I scatter lime, salt, sulphur, and condensed lye, which soon eats up the iron, and the whole is absorbed by the ground as food for the tree. If the earth is dry, I wet these ingredients with water by pouring it on the ground where they are buried. I then scatter over the ground under the branches a compound of sulphur and salt, two pounds of the latter to one of the former.

The approximate amounts of the different articles used in the treatment of each tree of, say, five years' growth are as follows: salt, five pounds; lime, four pounds; condensed lye, one-half pound; sulphur, two pounds; cast-iron, five pounds; soap varnish, one quart.

In place of the cast-iron, if desired, copperas may be substituted.

This treatment will be found effectual for all kinds of diseases in trees affecting the fruit, including curculio in plum.

The best time to treat the tree is very early in the spring, as soon as the ground thaws up.

What I claim as new, and desire to secure by Letters Patent of the United States, is—

The process of treating diseased fruit-trees, which consists in cutting away the diseased branches, varnishing the trunk and branches with soap, burying under the roots cast-iron covered with a compound of condensed lye, lime, and sulphur, wetting the same, and in scattering over the ground sulphur and salt, in substantially the proportions specified.

JOHN H. ASKIN.

Witnesses:
J. B. JONES,
EUGENE S. WEST.